United States Patent [19]

Versini

[11] Patent Number: 4,934,258

[45] Date of Patent: Jun. 19, 1990

[54] PERCOLATION APPARATUS AND METHOD

[76] Inventor: Rolland Versini, La Rouviere - 83 Bd. du Rodon, 13000 Marseille, France

[21] Appl. No.: 19,238

[22] Filed: Feb. 25, 1987

[30] Foreign Application Priority Data

Feb. 26, 1986 [FR] France ............................. 86 02636
Feb. 26, 1986 [FR] France ............................. 86 02637

[51] Int. Cl.⁵ .................... A47J 31/44; A47J 31/54; H05B 3/60
[52] U.S. Cl. .................................. 99/289 R; 219/288
[58] Field of Search .................. 99/280, 287, 289 R, 99/293, 302 R; 219/274, 284, 288; 100/73, 131, 264, 244; 422/275

[56] References Cited

U.S. PATENT DOCUMENTS

| | | |
|---|---|---|
| 1,994,331 | 3/1935 | Ziskin et al. |
| 2,140,516 | 12/1938 | Cowan . |
| 2,519,515 | 8/1950 | Turner . |
| 2,538,129 | 1/1951 | Simrell . |
| 2,547,865 | 4/1951 | Hanks .................................. 219/288 |
| 2,617,010 | 11/1952 | Schmitz . |
| 2,881,692 | 4/1959 | Volcov ......................... 99/302 R X |
| 3,996,849 | 12/1976 | Del Jiacco ....................... 100/264 X |
| 4,230,033 | 10/1980 | Cuccia . |
| 4,419,302 | 12/1985 | Nishino et al. . |

FOREIGN PATENT DOCUMENTS

| | | |
|---|---|---|
| 0730451 | 5/1969 | Belgium . |
| 0117583 | 9/1984 | European Pat. Off. . |
| 2053466 | 5/1971 | Fed. Rep. of Germany . |
| 2156467 | 6/1973 | France . |
| 2202668 | 5/1974 | France . |
| 2226137 | 11/1974 | France . |
| 2338022 | 8/1977 | France . |
| 0521115 | 1/1970 | Switzerland . |
| 658583 | 11/1986 | Switzerland ...................... 99/289 R |

OTHER PUBLICATIONS

Power, vol. 122, (Feb. 1978), pp. S. 9–S. 14, New York, U.S., "Electric Boiler and Hot Water Generators".

*Primary Examiner*—Harvey C. Hornsby
*Assistant Examiner*—Scott J. Haugland
*Attorney, Agent, or Firm*—Sandler, Greenblum & Bernstein

[57] ABSTRACT

Apparatus for infusing an infusible substance which comprises:
(a) first means for containing the infusible substance during infusion;
(b) second means for containing the infusible substance between it and the first means during the infusion; and
(c) activation means for raising and lowering the first and second means.

The activation means preferably comprises:
(i) first rack means for lowering the first means;
(ii) second rack means for raising the second means; and
(iii) single drive means for activating the first and second rack means.

16 Claims, 7 Drawing Sheets

Fig. 1
Fig. 2
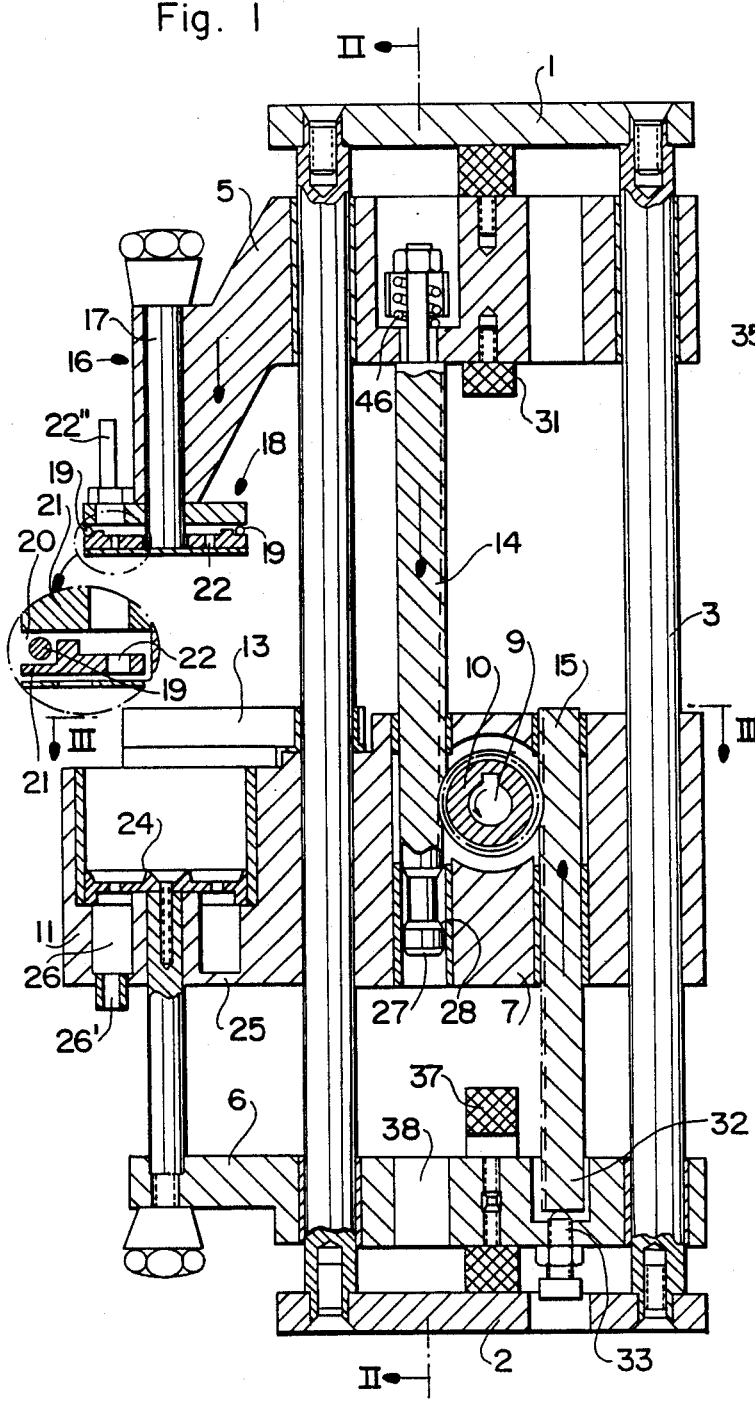
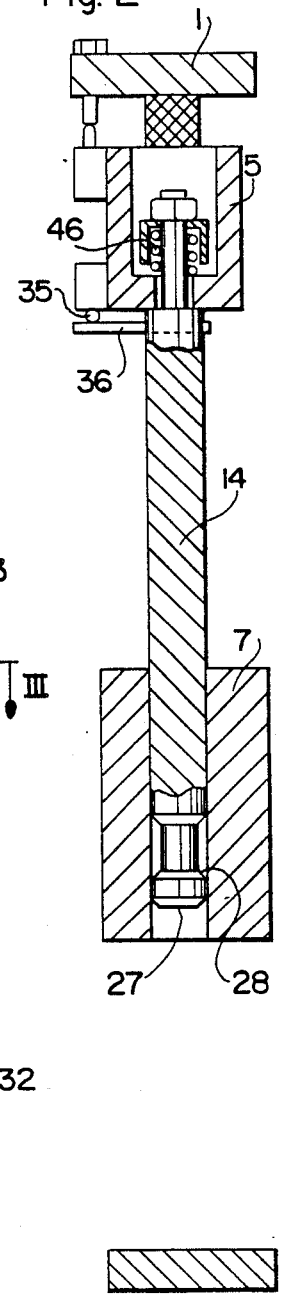

PERCOLATION APPARATUS AND METHOD

BACKGROUND OF THE INVENTION

1. Field of the Invention

The present invention relates to an apparatus allowing for the automatic production by percolation of alimentary liquids and particularly hot drinks such as coffee obtained by passing water at an appropriate temperature across a bed of infusible products in the pulverized state such as ground coffee.

2. Description and Background Information and Relevant Material

The invention has as an aim to allow for the manufacture, under entirely automatic conditions, and without human intervention by a waiter or user, other than the transmission of an initial control signal, of a hot drink such as an "expresso" type coffee, i.e., delivered and made available to the consumer immediately and directly after the percolation phase.

In apparatus of this type, it is known that the infusible substance which may be in the form of a powder will have a granulometry, dryness, etc. which may vary from day to day. As a result, when using apparatus which has been preprogrammed to provide an infusion liquid at a fixed temperature, for a fixed period of time, in a fixed amount, the quality of the final product may vary considerably.

This effect is further increased since in those systems wherein the infusible charge is compressed by a given amount, the extent of compression will result in a different quality of product again depending upon the compressibility of a given charge of material.

SUMMARY OF THE INVENTION

It is, therefore, an object of the invention to provide an apparatus for infusing an infusible substance which comprises:

(a) first means for containing the infusible substance during infusion;
(b) second means for containing the infusible substance between it and the first means during the infusion; and
(c) activation means for raising and lowering the first and second means.

The activation means preferably comprises:

(i) first rack means for lowering the first means;
(ii) second rack means for raising the second means; and
(iii) single drive means for activating the first and second rack means.

By using the apparatus of the invention it is possible to provide an infused product whose quality is relatively unaffected by the particular characteristics of the charge being infused, even when based upon uniform parameters which have been pre-set.

Although its most obvious application is in connection with the percolation of coffee, particularly "expresso" coffee, it is to be understood that the invention is not limited to any one particular infusible substance and extends to include all infusible substances such as tea, herbs, etc.

The first and second means are positioned to move within a percolation chamber positioned in an intermediate element. The first and second means are adapted to allow for entry and departure of infusion fluid passing through the percolation chamber.

Guide means are provided for guiding movement of the first and second means. The guide means comprises at least one shaft extending through the first and second means and the intermediate element.

The intermediate element further comprises axial passages for the first and second rack means.

A pinion simultaneously drives the first and second rack means in opposite directions to bring together and separate the first and second means.

De-activation means arrest movement of the first means relative to the second means as a function of the relative spacing of the first and second means. The de-activation means comprises an interrupter mounted between the first rack means and the first rack. The first rack means is secured to the first means through elastic means whereby upon movement of the first rack means beyond the point at which the first means can move, the first rack means continues to move independently of the first means to de-activate the deactivation means.

Pinion reversal means reverse the direction of movement of the pinion as desired.

The second means comprises an orifice therein for removably receiving the first rack means therein. The orifice of the second means comprises spring biased spurs, and the first rack means is provided with a narrowed portion and a first bevelled surface configured to pass through the spurs whereby the first rack means is held by the spurs around the narrowed portion such that the first rack means and the second means move upwardly together, thereby raising the second means relative to the intermediate element.

The second means further comprises an infusible bottom positioned to move upwardly through the percolation chamber to raise and expose infused material for removal from the percolation chamber as the first rack means and the second means move upwardly together.

The narrowed portion ends in a bevelled portion, and the second rack means is dimensioned to oppose further simultaneous upward movement of the first rack means and the second means beyond a predetermined extent whereby subsequently the second rack means pushes down the second means and separates the second means from the first rack means.

Means may be provided for removing the infused substance. Such means may include a sweeper operated by the pinion to sweep the infusible bottom of infused material after it has been raised above the level of the percolation chamber.

According to another aspect of the invention steam supply means are provided as part of the apparatus for supplying steam to the infusible substance between the first and second means.

According to one preferred embodiment the steam supply means comprises a water reservoir with a curtain of wicking material partially submerged in the water reservoir. The curtain is energizable to vaporize and supply steam to the infusible substance.

According to yet another aspect of the invention means are provided for automatically supplying the infusible substance between the first and second means.

BRIEF DESCRIPTION OF THE DRAWINGS

The invention will now be described with reference to the annexed drawings given by way of non-limiting example only in which:

FIG. 1 illustrates a vertical cross-sectional view of an apparatus according to the invention, the blocking piston being in the lifted disengaged position and the filtration bottom being in the rest position in the bottom of the percolation chamber;

FIG. 2 illustrates a vertical cross-sectional view along line II—II of FIG. 1;

DESCRIPTION OF PREFERRED EMBODIMENTS

Figure 3:
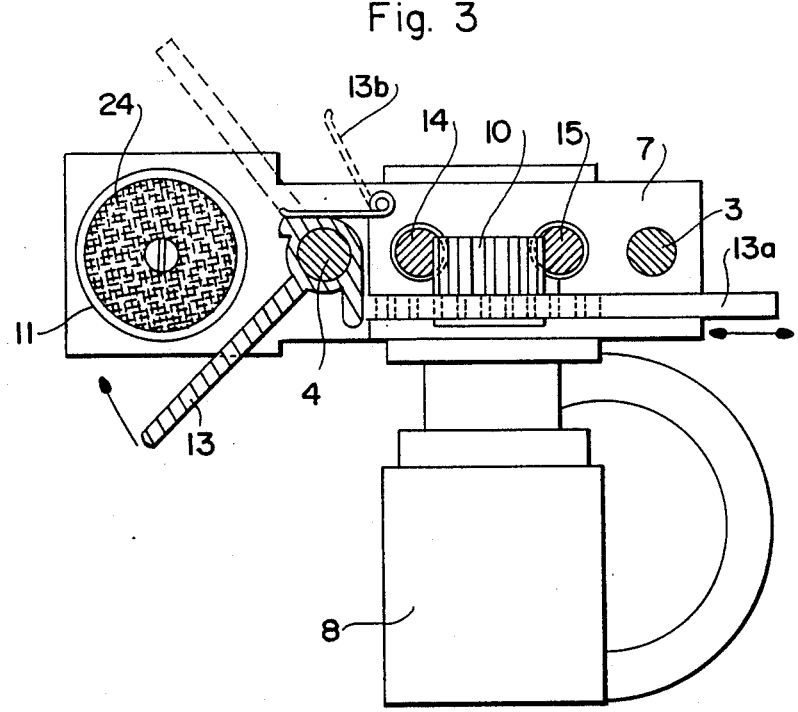
FIG. 3 illustrates a horizontal cross-sectional view along line III—III of FIG. 1.

The invention is directed to an apparatus for the automatic and instantaneous percolation of alimentary liquids for dispensing quantities corresponding to a unit of consumption or a multiple of this unit.

The apparatus comprises a percolation chamber open on one side, a reserve of infusible percolation products and discharge means for discharging the products in the chamber. A blocking piston is adapted to block the open face of the chamber while compressing the unitary charge of percolation products contained in the chamber being adapted to receive a source of liquid, particularly water at an appropriate temperature. The chamber comprises a filtration bed provided with openings for the passage of the percolated liquid towards a drain. A bottom of the chamber is moveably mounted and connected, for this purpose, to drive means for the blocking piston of the chamber on the one hand, and the moveable bottom on the other hand. The two elements are displaced along co-linear axes which are co-linear to one another and co-linear with the axis of the chamber, the blocking piston and the moveable bottom being driven during at least one part of their movement, by a single manipulation element common to the piston and to the moveable bottom. The moveable bottom is integrally mounted with a socket adapted to be vertically displaced the length of the guidance elements integrally affixed to the frame. The socket is adapted to be coupled by integration means having automatic engagement to the common displacement element over a limited extent of travel corresponding to the displacement of the bottom in the chamber from its rest position towards the open surface of the chamber for ejection of the filtration cake.

As may be seen in the attached Figures the apparatus is constituted by a fixed frame formed, for example, of a body constructed of two platens, respectively an upper platen 1 and a lower platen 2 between which are mounted vertical columns forming guidance columns 3 and 4.

Upper socket 5 and lower socket 6 are moveably mounted on the frame.

The two sockets mounted for vertical displacement are guided by columns 3 and 4 which are respectively engaged in openings which may, for example, be provided with a non-stick polytetrafluoroethylene coating, on each of the sockets.

Intermediate block 7 is fixedly mounted in the substantially median position on the columns. Intermediate block 7 is integral with the columns and supports motor block 8 which may, for example, be formed of an electric motor having a reversible movement and whose output shaft 9 drives pinion gear 10. Although as illustrated in the drawings the motor is shown to be exterior to the apparatus (see FIG. 3, for example), it is to be understood that the invention is not limited to the particular positioning of the motor which may likewise be positioned within the apparatus itself.

A percolation chamber is constituted by a central opening 11 in the front portion of intermediate block 7.

Intermediate block element 7 likewise supports means for feeding and discharging the solid infusible products to and from the percolation chamber, i.e., feeding of the powder or ground coffee at the beginning of the cycle, as well as the evacuation of the filtration cake at the end of the cycle.

The feeding means comprises a a pouring spout funnel 12 receiving the coffee in powder form from a storage area (described below) by means of a charging apparatus.

Socket 7 likewise supports rake 13 which makes it possible, by virtue of its lateral sweeping movement, to evacuate the filtration cake at the end of the cycle, after it has been raised by elevation of the filtration bottom as will be explained below.

Rake 13 is driven in a lateral angular sweeping movement from a fixed journal axis constituted by column 4, such that during an initial phase rake 13 sweeps the top of the percolation chamber 11 to laterally evacuate the preceeding filtration cake. Rake 13 is driven by the toothed rack 13a which is itself activated by pinion 10. The assembly is adjusted such that the sweeping by the rake occurs when bottom 24 is in the raised position to allow for extraction of the filtration cake. When toothed rake 13a returns to the rear, the rake is returned to the initial position (in dashed lines in FIG. 3) which is laterally retracted with respect to percolation chamber 11, by return spring 13b.

Figure 10:
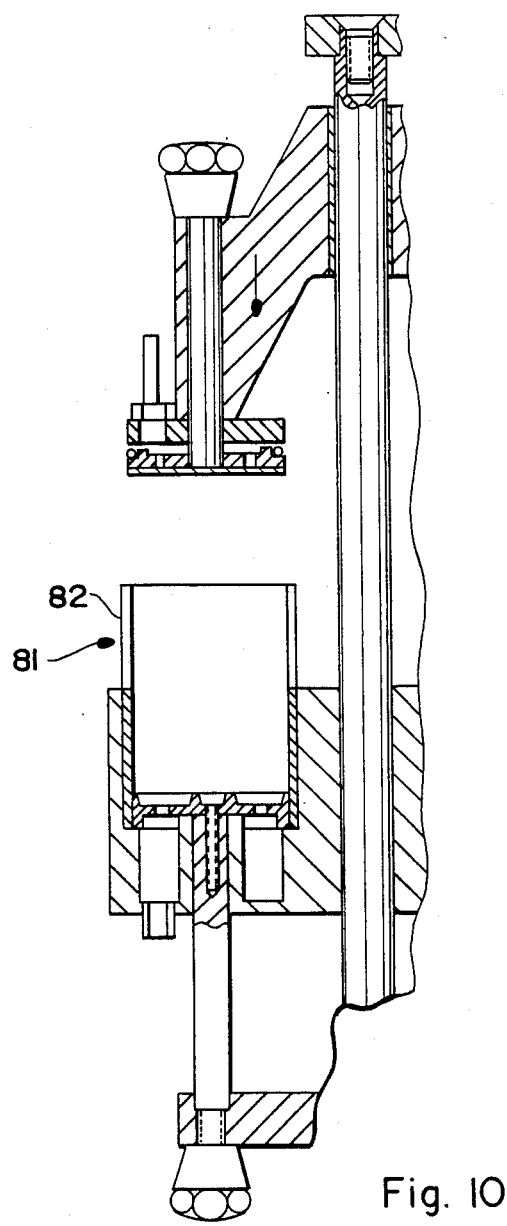
FIG. 10 illustrates a partial vertical cross-sectional view of an alternate embodiment of the invention.

The invention has been described with reference to an embodiment in which the apparatus is vertically mounted such that specific means must be provided for sweeping away material which has previously been infused. However, it is likewise possible to mount the entire apparatus horizontally such that as the infused material is ejected out of the percolation chamber it falls of its own weight. In this embodiment, illustrated in FIG. 10, it is likewise possible to provide the top portion of the percolation chamber with a generally cylindrical cap 81 having an opening 82 in its wall through which the charge can be fed. The cylinder holds the charge until it is compressed into the percolation chamber. When the charge is to be removed, it need only be pushed beyond the upper rim of the cylinder for the charge to fall away of its own weight. Although a rake system such as that of the invention may be used in this instance as well, it may prove unnecessary since gravity may suffice to do all that is required.

Figure 8:
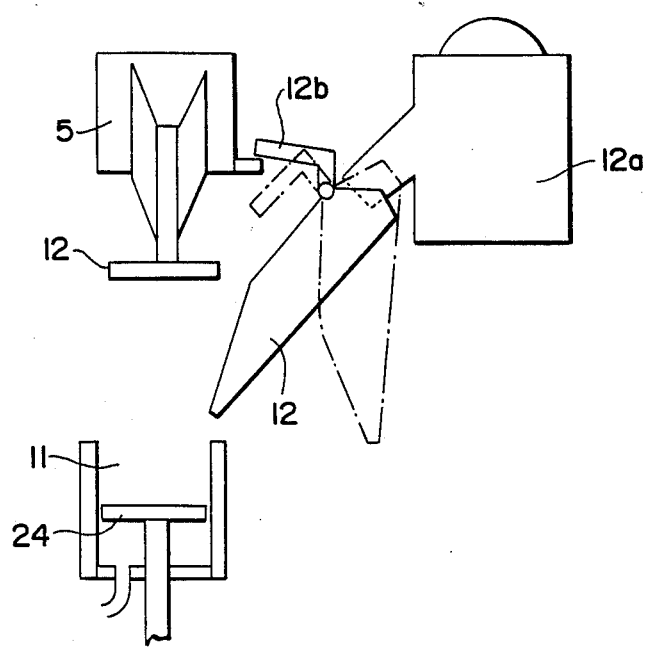
FIG. 8 illustrates schematically the principle of operation of the retractable pouring spout for the filling of the percolation chamber with a coffee charge.

The filling funnel (or funnel segment) 12, as seen in FIG. 8, is freely pivotable on charging apparatus 12a and it is placed in the active discharge position by the rising action of upper socket 5 on lever arm 12b. During return of socket 5 (and of piston 16–18) to the lowered position the pouring spout is returned to its retracted position (as shown in dotted lines in the drawing) by simple gravity.

Although the invention has been illustrated in the instant application in connection with a funnel system which supplies the infusible material, it is to be expressly understood that the invention is not limited to the particular means used to supply the infusible material. Thus, the infusible substance may be supplied in the form of cartridges, discs, or packaged charges of any shape or form which may be manually or automatically inserted into the percolation chamber.

Intermediate block element 7 is bored with a horizontal bore to accommodated pinion 10. This block is likewise bored with two vertical bores to allow for the passage and displacement of two symmetrical drive elements, i.e., a principle drive element constituted by a first rack 14, and a second drive element constituted by a rack 15 which is symmetrical with the proceeding rack. The two racks are mounted on two diametrically opposed sides of pinion 10 such that in a predetermined drive movement of the pinion the two racks move in opposite directions along their respective paths.

Upper moveable socket 5 which is adapted to slide, as previously explained, on the two guidance columns respectively 3 and 4 is integrally mounted on the upper portion of first rack 14.

Upper socket 5 comprises, integrally mounted on the front portion of the socket, a blocking piston 16 formed of a shaft 17 integral with socket 5 and a horizontal plate 18 whose circumference is adapted to allow for its engagement, with a slight play, with the interior of the upper portion of percolation chamber 11.

In a known fashion the wall of plate 18 is in fluid communication with one or more supply openings 22'' which provide hot water from a hot water source at a suitable desired temperature through one or more openings 22, 22'.

Lower socket 6 is positioned at the lower portion of the apparatus. Shaft 23 is integrally secured to the front portion of lower socket 6, and is integral with filtration bottom 24 which is movably mounted relative to the the interior of percolation chamber 11.

The horizontal wall constituting filtration bottom 24 is thus moveable upon vertical displacement of moveable socket 6 under conditions which will be described below.

At its lower portion the percolation chamber is blocked by bottom 25 which forms collector 26 for the percolation liquid which has traversed the filtration bottom. The liquid is evacuated to the exterior by a draining spout from passage 26'. A central opening in the lower blocking wall 25 allows for the passage and movement of shaft 23 for raising or lowering filtration bottom 24.

OPERATION

The operation of the apparatus assembly can be described as follows, beginning with the motor means constituted by electric motor 8 and central pinion 10.

In the rest position which is shown in FIG. 1, the two sockets are in the disengaged position at the opposite ends of the apparatus. Upper socket 5 is in the raised position while lower socket 6 is in the lowered position.

In this position the percolation chamber 11 is at rest and is waiting to be filled. The pouring spout 12 is itself in the waiting position above chamber 11. Programming means (not shown) are provided for sequencing the various phases of the cycle which will be described below. Either conventional analog sequencing means such as timers and sensors may be used, or a microprocessor chip may be used for this purpose.

The cycle commences with the pouring of the powder by the spout followed by the retraction of the spout towards a lateral position, as soon as socket 5 begins its descent as explained below.

The rotation of pinion 9 in the direction of the arrow shown in FIG. 1 causes the movement of the racks, i.e., first rack 14 and second rack 15 in the directions indicated by the arrows in FIG. 1.

In this movement upper socket 5 drops until plate 18 reaches the surface of the ground coffee waiting in percolation chamber 11.

When plate 18 meets the coffee surface, the approach of the two planes of 21 and 21' which form plate 18 results in toric joint 19 becoming compressed to seal the contact of plate 18 of piston 16 and block percolation chamber 11. Piston 16 is thus in the fixed stop position, having come into abutment against the coffee charge contained in the percolation chamber 11.

However, the motor continues to turn and to drive rack 14 downwardly along the direction of the arrow of FIG. 1 while blocking piston 16 is in abutment or braked by the charge of coffee which it has met in the percolation chamber. During this relative movement rack 14 is displaced with respect to socket 5 (integral with piston 16) by compressing intermediate spring 46 until the de-activation of an interrupter switch which shuts off the feed of the motor and stops the movement of rack 14.

The interrupter switch is formed, for example, by a contact 35 integral with socket 5 which is positioned to contact abutment 36 integral with the top of rack 14 when spring 26 is in the relaxed position (see FIG. 2, the position of socket 5 in the raised position). As soon as piston 16–18 abuts against the coffee charge in chamber 11, socket 5 is blocked while rack 14 continues to move further to a limited extent while compressing spring 46. During this relative movement contact 35 is disengaged from its rest position on abutment 36 which opens the feed circuit of the motor and interrupts the movement of rack 14.

Spring 46 also serves a safety role by allowing for a limited movement of piston assembly 16–18 under the effect, for example, of the vapor pressure in chamber 11 during the percolation phase, without transmitting this movement to the motor. The motor is thus not stopped in a blocked position.

It is seen that by virtue of the configuration of the apparatus of the invention, the positioning of piston 16 and more particularly plate 18 assures the piling and the compression of powder in chamber 11 to occur automatically, independently of any pre-programming, as a function of the level of the powder in the chamber.

After the liquid has percolated and gone through the bed of solid products it is received in collector chamber 26 in bottom 25 and then drained towards the exterior where it can be channelled in a known fashion by a pouring spout into a cup or any appropriate recipient.

The programmed cycle continues with disengagement of piston 16 and the evacuation of the filtration cake corresponding to the pressed coffee in percolation chamber 11.

Figure 6:
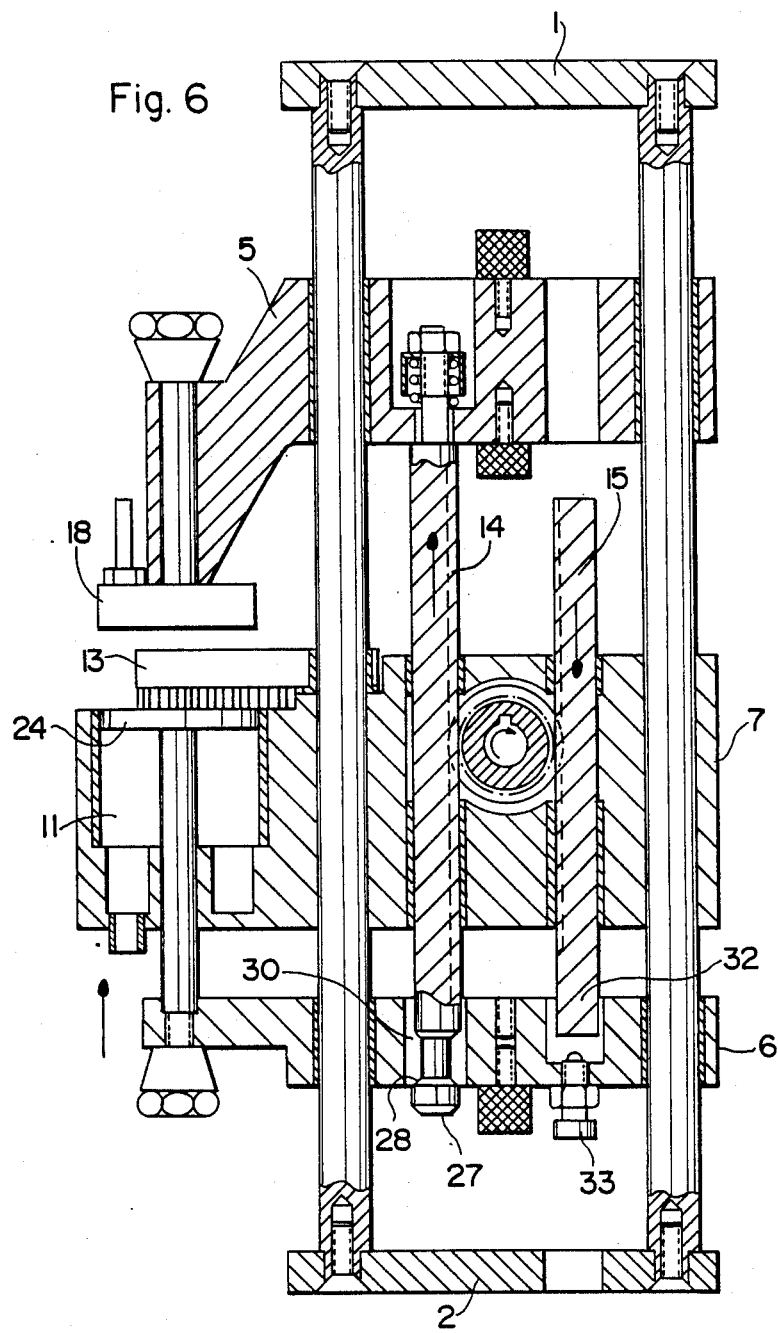
FIG. 6 illustrates the vertical cross-sectional view identical to FIG. 1 and FIG. 3, the piston being brought into the disengaged position and the bottom being in the raised position for ejection of the cake.
Figure 7:
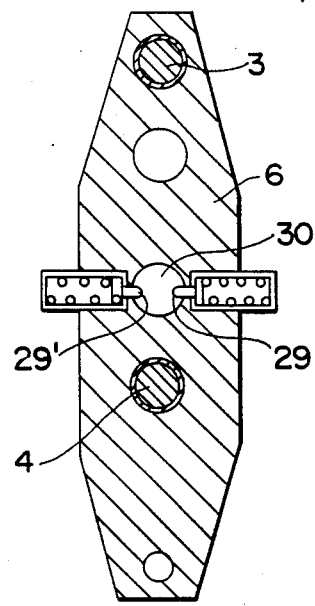
FIG. 7 illustrates a detailed planar view of the lower socket end of the engaging apparatus on the rack.

As may be seen in FIG. 1, the motor having been placed in operation in a movement reverse to that which has preceeded, will drive pinion 10 turn in the direction of the arrow in FIG. 6, and the first rack 14 and second rack 15 are driven in a reverse movement to the preceeding, i.e., first rack 14 rises while second rack 15 drops back.

During this phase of movement first rack 14 will drive lower socket 6 downwardly. To accomplish this, at the base of first rack 14, the rack ends in a bevelled edge 27. A hollowed interior bevelled shoulder 28 is provided to cooperate with spurs forming ratchets 29 and 29' which project to the interior of opening 30 situated directly above the base of bevelled head 27 of first rack 14, on lower socket 6.

When first rack 14 reaches its lower position, head 27 engages opening 30, while the bevelled walls 29 push the exterior of ratchets 29 and 29' until shoulder 28 reaches the level of the ratchets making it possible for the ratchets to elastically return to their extended position towards the interior of opening 30.

After engagement of ratchets 29 in shoulder 28 first rack 14 continues its movement over a limited extent while moving socket 6 together therewith. The rack is stopped by de-energization of the drive means as previously explained when plate 18 contacts the the powdered product in the percolation chamber, and encounters a resistance to further movement.

In any case, elastically compressible shock absorption abutment 31 serves as a safety by preventing possible contact between upper socket 5 with intermediate fixed block 7.

After the piston has blocked the percolation chamber, and the coffee charge has percolated for the desired length of time, the drive means is reversed such that the pinion now rotates in the direction of the arrow shown in FIG. 6.

As the pinion is rotated first rack 14 is raised. As a result shoulder 28 comes to rest against ratchets 29. Further lifting by rack 14 raises lower socket 6 while it is guided by columns 3 and 4. As socket 6 rises it lifts shaft 23 along with it, thereby raising moveable filtration bottom 24 up through the interior of chamber 11.

The rising movement continues until socket 6 abuts against the lower base of fixed central block 7 which the interposition of an adjustable grommet 6'. The resistance and blockage which result overcomes the resistance of ratchets 29 and 29', and causes the retraction of ratchets 29 and 29' the length of the bevelled wall of shoulder 28 thereby disengaging socket 6 from the movement of the first rack 14. Preferably the contact of socket 6 with central block 7 is cushioned by a shock absorption abutment 37 whose height position is adjustable.

The uncoupling is adjusted in a fashion so as to occur when the moveable filtration bottom 24 has arrived in the raised position, i.e., substantially at the upper level of filtration chamber 11, a movement which exposes the filtration cake constituted by the earlier percolation marcs.

In an alternative embodiment (not shown), the ratchet-spur system can be replaced by a magnetic system which holds the rack in place until the rack separates these from upon the lower socket encountering sufficient resistance.

Figure 4:
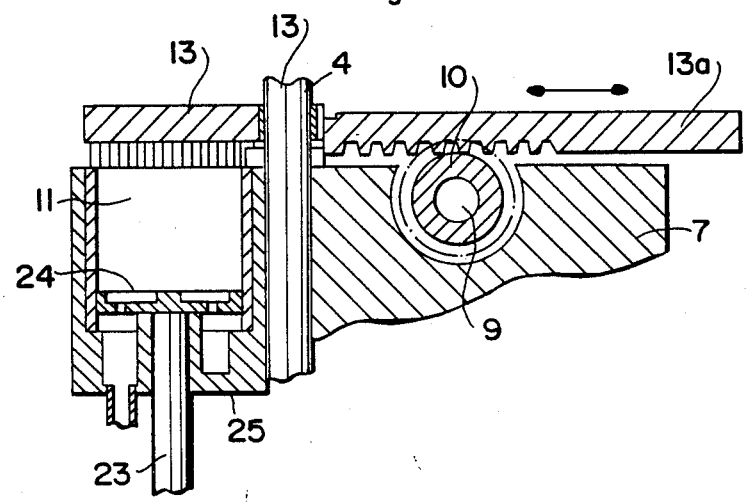
FIG. 4 illustrates a detailed view of the drive means for the sweeping rake.
Figure 5:
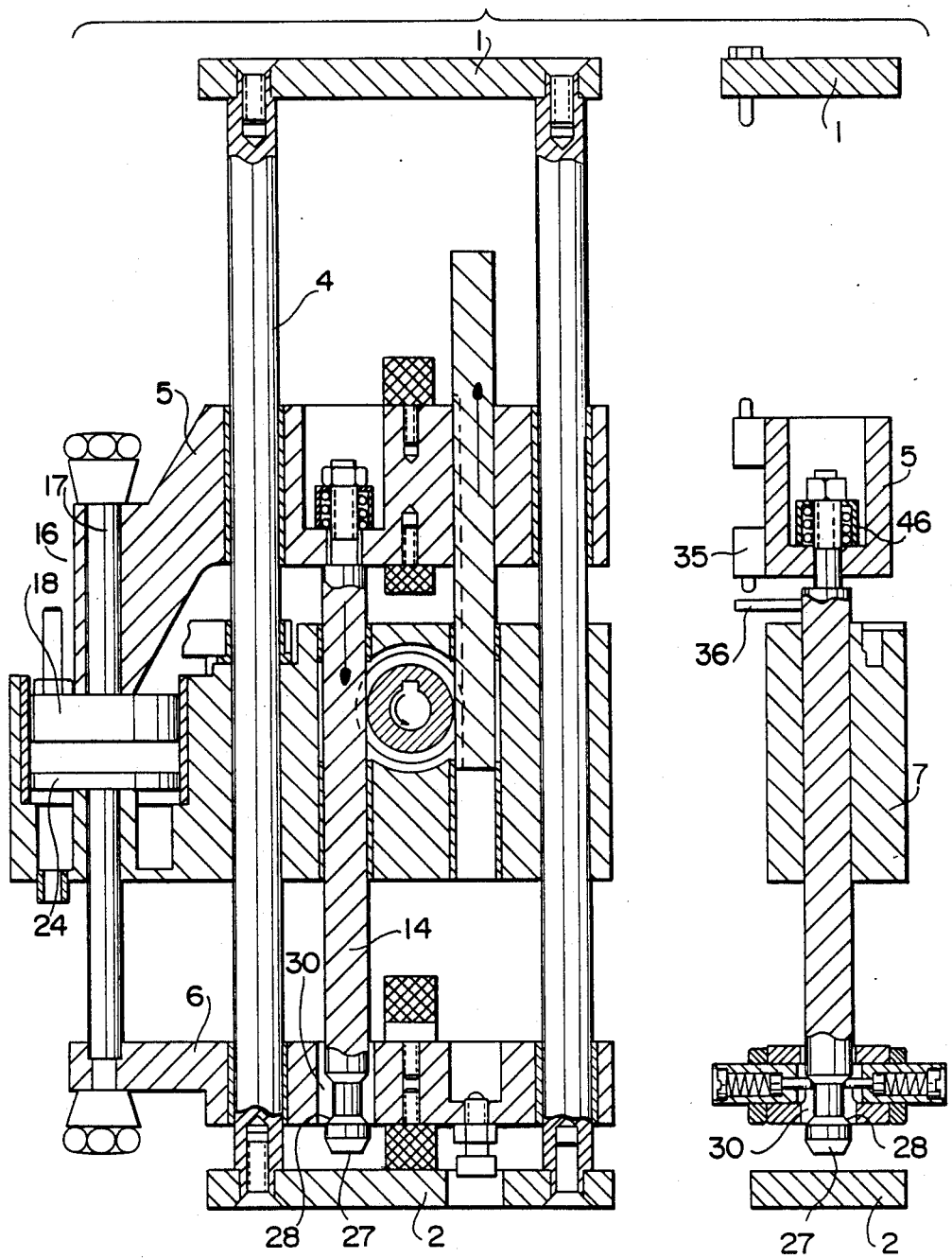
FIG. 5 illustrates a vertical cross-sectional of the apparatus, identical to FIG. 1 but illustrating the blocking piston in the lowered position during the percolation phase.

Once exposure of the marc has occurred, FIGS. 3 and 4 illustrate the lateral translational movement of rake 13 which then may occur to laterally disengage the filtration cake. Rack 13a is reciprocated by pinion 10 to sweep rake 13 over raised filtration bottom 24, against the bias of spring 13b. The cake may then be removed to a recovery container. Socket 6 remains in the raised position during this time.

After this operation has been completed, the pinion continues to drive the two racks in the direction shown in FIG. 6.

Rack 15 continues its descent until it comes into contact, at its base 32, with adjustable abutment 33 integrally mounted with socket 6 and in its descending movement the second rack 15 pushes towards the bottom socket 6 until the socket is in the lower or bottom position (such as shown in FIG. 1). As socket 6 drops, it lowers shaft 23, and together with it filtration bottom 24 which thus comes to rest at the bottom of percolation chamber 11.

FLUID SOURCE

Preferably, the apparatus can be coupled to a high temperature alimentary fluid source, particularly steam.

Figure 9:
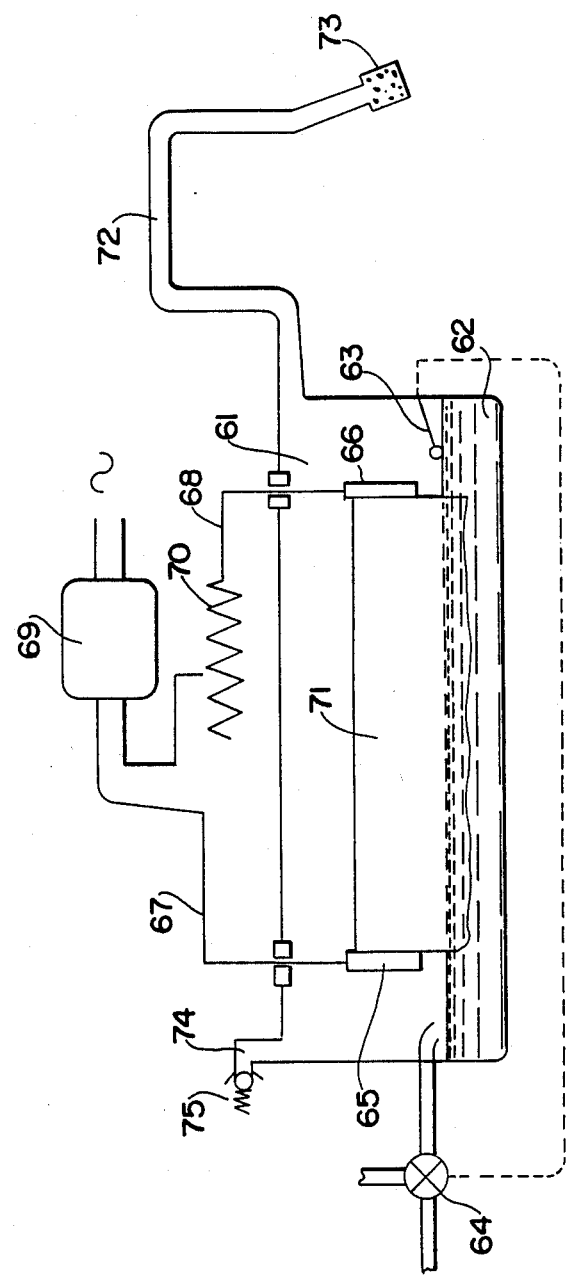
FIG. 9 illustrates a schematic view of a vapor source associated with the apparatus according to the invention.

According to one embodiment (illustrated in FIG. 9) steam may be provided by an apparatus constituted by a chamber 61 fed with water by an electro-valve 64. The chamber comprises a sensor 63 controlling electro-valve 64 so as to assure a water reserve 62 at a constant level. The chamber further comprises an outlet 72 to evacuate the steam produced. A power supply source 69 energizes terminals 65 and 66 electrify interposed curtain 71 made of an absorbent material such as fiberglass whose base is submerged in reservoir 62. An outlet 74 provided with safety valve 75 is provided to bleed any excess pressure in the chamber.

The passage of current in the absorption and water-impregnated environment 71 causes the instantaneous vaporization of the water and the steam escapes through conduit 72. A timer 69 makes it possible to time the production of steam and adjust it to the time required. A variable resistance 70 makes it possible to adjust the characteristics of the current and thus the rapidity of vaporization as required.

Although the invention has been described with reference of particular means, materials and embodiments it is to be understood that the invention is not limited to the particulars disclosed and extends to all equivalents within the scope of the claims.

What is claimed is:

1. Apparatus for infusing an infusible substance comprising:
   (a) first means for containing said infusible substance during infusion;
   (b) second means for containing said infusible substance between it and said first means during said infusion wherein said first means and said second means are positioned to move within a percolation chamber positioned in an intermediate element, said first means and said second means being adapted to allow for entry and departure of infusion fluid passing through said percolation chamber;

(c) activation means for raising and lowering said first and second means, said activation means comprising:
  (i) first rack means for lowering said first means;
  (ii) second rack means for raising said second means;
  (iii) single drive means for activating said first and second rack means;
(d) means for de-activating said single drive means responsive to a predetermined force being applied against said first means so that said first means is thereby movable toward said second means through a distance dependent upon the nature of the infusible substance contained by said first means and said second means; and
(e) guide means for guiding movement of said first means and said second means, said guide means comprising at least one shaft extending through said first means and said second means and said intermediate element.

2. The apparatus as defined by claim 1 wherein said intermediate element further comprises axial passages for said first and second rack means.

3. The apparatus as defined by claim 2 wherein said single drive means comprises a pinion for simultaneously driving said first and second rack means in opposite directions to bring together and separate said first and second means.

4. The apparatus as defined by claim 3 wherein said de-activation means further comprises means for arresting movement of said first means relative to said second means as a function of the relative spacing of the first and second means, said deactivation means comprising an interrupter mounted between said first rack means and said first means, and wherein said first rack means is secured to said first means through elastic means whereby said first rack means can continue to move dependently of said first means from a point at which said first means is prevented from moving to activate said de-activation means.

5. The apparatus as defined by claim 4 comprising pinion reversal means for reversing the direction of movement of said pinion as desired.

6. The apparatus as defined by claim 5 wherein said second means comprise an orifice therein for removably receiving said first rack means therein.

7. The apparatus as defined by claim 6 wherein said orifice of said second means comprise spring biased spurs, and said first rack means is provided with a narrowed portion and a first bevelled surface configured to pass through said spurs whereby said first rack means is held by said spurs around said narrowed portion such that said first rack means and said second means move upwardly together, thereby raising said second means relative to said intermediate element.

8. The apparatus as defined by claim 1 wherein said second means comprises a filtration bottom positioned to move upwardly through said percolation chamber to raise and expose infused material for removal from said percolation chamber as said first rack means and said second means move upwardly together.

9. The apparatus as defined by claim 8 wherein said narrowed portion ends in a bevelled portion, and wherein said second rack means is dimensioned to opposite further simultaneous upward movement of said first rack means and said second means beyond a predetermined extent whereby subsequently said second rack means pushes down said second means and separates said second means from said first rack means.

10. The apparatus as defined by claim 8 further comprising means for removing said infusible substance after it has been infused.

11. The apparatus as defined by claim 10 wherein said means for removing said infusible substance comprises a sweeper operated by said pinion to sweep said infusible bottom of infused material after it has been raised above the level of said percolation chamber.

12. The apparatus as defined by claim 1 further comprising steam supply means for supplying steam to said infusible substance between said first and second means.

13. The apparatus as defined by claim 12 wherein said steam supply means comprises a water reservoir with a curtain of wicking material partially submerged in the water reservoir, said curtain being energizable to vaporize and supply steam to said infusible substance.

14. The apparatus as defined by claim 1 further comprising means for automatically supplying said infusible substance between said first and second means.

15. The apparatus as defined by claim 1 wherein said percolation chamber includes an extension having an opening therein for feeding said infusible substance therethrough.

16. A method of using the apparatus of claim 1 comprising:
  (a) charging said percolation chamber with a quantity of an infusible substance;
  (b) moving said first means toward said quantity of infusible substance in said percolation chamber by driving said single drive means for lowering said first rack means;
  (c) sensing a predetermined force being applied against said first means;
  (d) de-activating said single drive means in response to said step of sensing said predetermined force being applied against said first means to maintain a constant force against said quantity of infusible substance within said percolation chamber;
  (e) percolating a fluid through said quantity of infusible substance; and
  (f) discharging said quantity of infusible substance from said percolation chamber.

* * * * *

UNITED STATES PATENT AND TRADEMARK OFFICE
CERTIFICATE OF CORRECTION

PATENT NO. : 4,934,258

DATED : June 19, 1990

INVENTOR(S) : Rolland VERSINI

It is certified that error appears in the above-identified patent and that said Letters Patent is hereby corrected as shown below:

Column 3, line 22, delete "and".
Column 3, line 25, change "." to ---; and---.
Column 4, line 30, change "a a" to ---a---.
Column 4, line 34, change "Socket" to ---Intermediate block element---.
Column 4, line 48, before "13a", change "rake" to ---rack---.
Column 5, line 21, change "accommodated" to ---accommodate---.
Column 5, line 50, change "the the" to ---the---.
Column 6, line 17, change "9" to ---10---.
Column 6, line 45, change "26" to ---46---.
Column 7, line 2, change "recipient" to ---receptacle---.
Column 7, line 9, before "turn" insert ---to---.
Column 7, line 28, after "29" insert ---and 29'---.
Column 7, line 45, after "29" insert ---and 29'---.
Column 8, line 18, change "with" to ---within---.
Column 8, line 36, before "electrify" insert ---to---.
Column 8, line 51, before "particular", change "of" to ---to---.
Column 9, line 40 (claim 4, line 10), change "dependently" to ---independently---.
Column 10, line 1 (claim 8, line 1), change "1" to ---7---.

UNITED STATES PATENT AND TRADEMARK OFFICE
CERTIFICATE OF CORRECTION

PATENT NO. : 4,934,258

DATED : June 19, 1990

INVENTOR(S) : Rolland Versini

It is certified that error appears in the above-identified patent and that said Letters Patent is hereby corrected as shown below:

Column 3, line 10, before "of" insert ---view---.

Signed and Sealed this

Fifth Day of May, 1992

Attest:

DOUGLAS B. COMER

Attesting Officer

Acting Commissioner of Patents and Trademarks